Jan. 14, 1958     W. G. KLETTKE     2,819,699
COMBINED AUTOMATIC FOOD DISPENSER AND EXERCISING CAGE
Filed Oct. 7, 1954     4 Sheets-Sheet 1
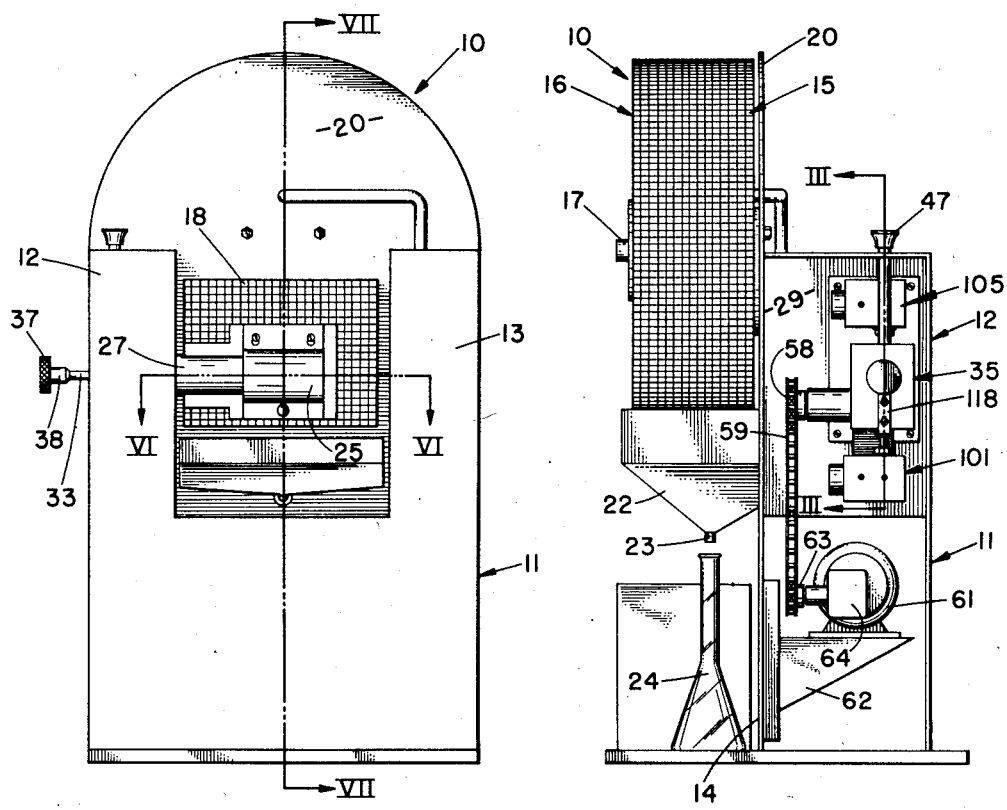
fig. 1
fig. 2
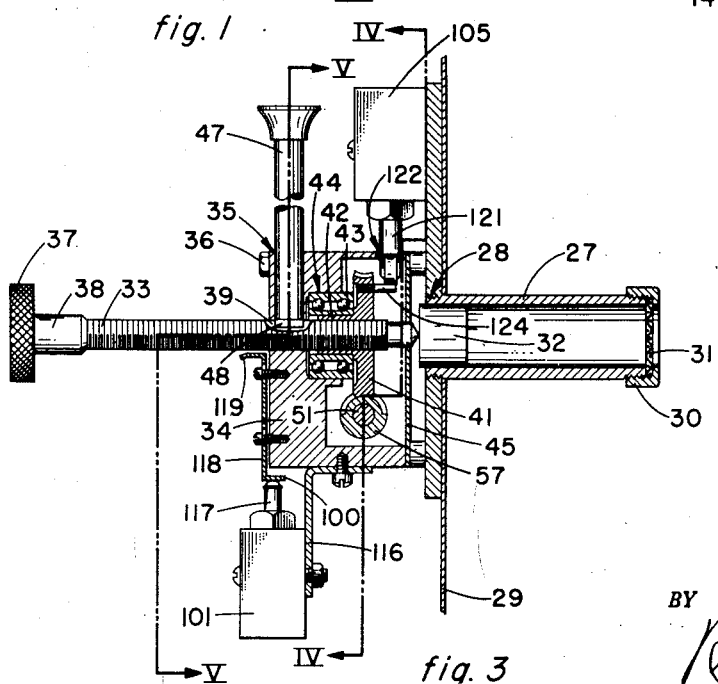
fig. 3
INVENTOR.
WALTER G. KLETTKE
BY
ATTORNEY Jan. 14, 1958  W. G. KLETTKE  2,819,699
COMBINED AUTOMATIC FOOD DISPENSER AND EXERCISING CAGE
Filed Oct. 7, 1954  4 Sheets-Sheet 2
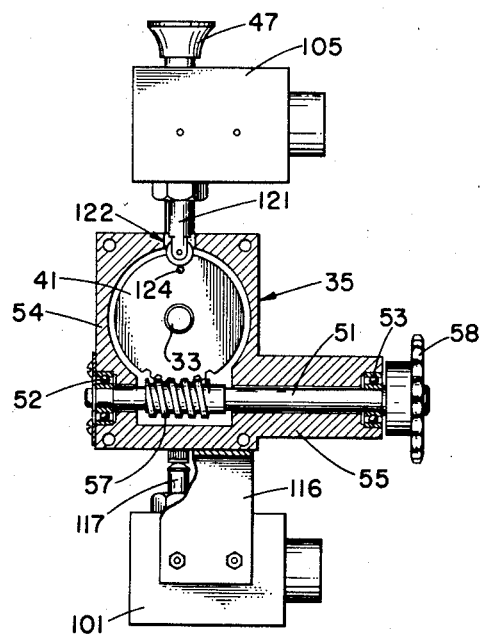
fig. 4
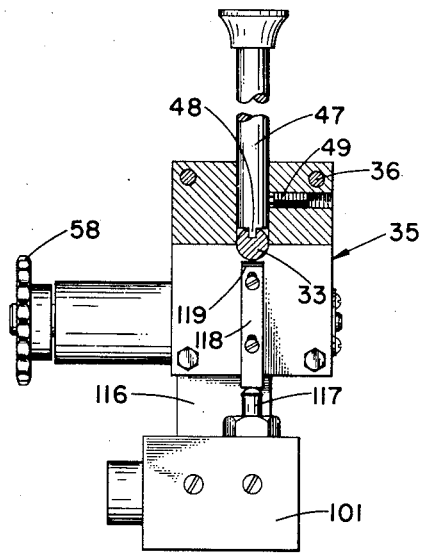
fig. 5
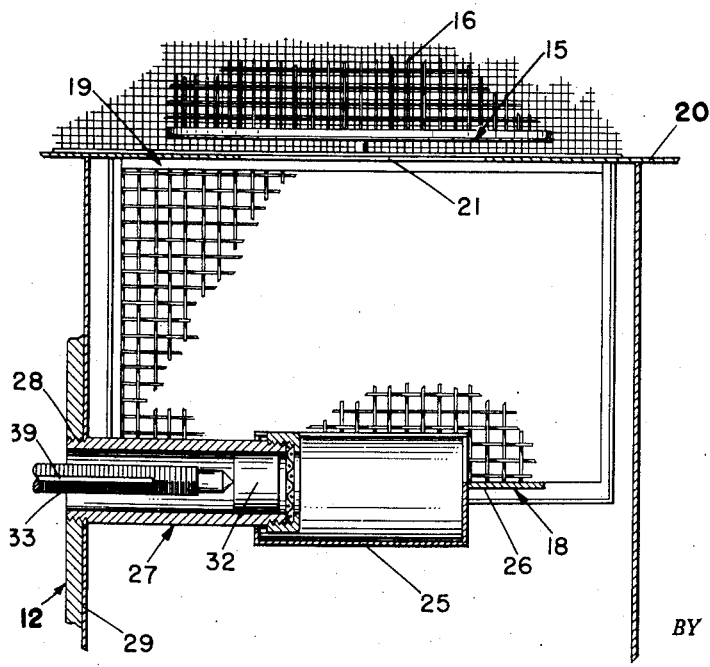
fig. 6
INVENTOR.
WALTER G. KLETTKE
BY
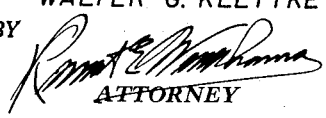
ATTORNEY Jan. 14, 1958 W. G. KLETTKE 2,819,699
COMBINED AUTOMATIC FOOD DISPENSER AND EXERCISING CAGE
Filed Oct. 7, 1954 4 Sheets-Sheet 3
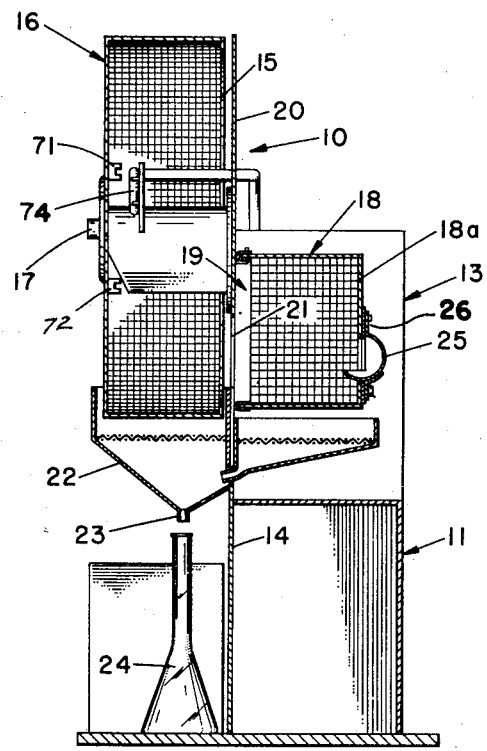
fig. 7
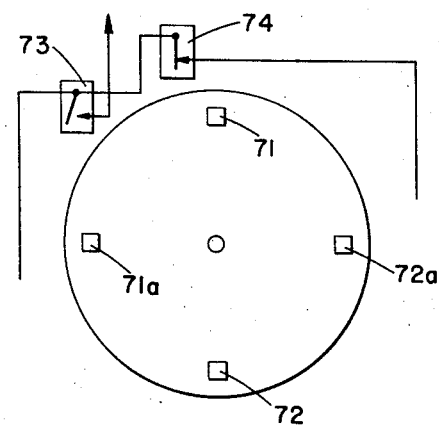
fig. 9
INVENTOR.
WALTER G. KLETTKE
BY
ATTORNEY Jan. 14, 1958  W. G. KLETTKE  2,819,699
COMBINED AUTOMATIC FOOD DISPENSER AND EXERCISING CAGE
Filed Oct. 7, 1954  4 Sheets-Sheet 4
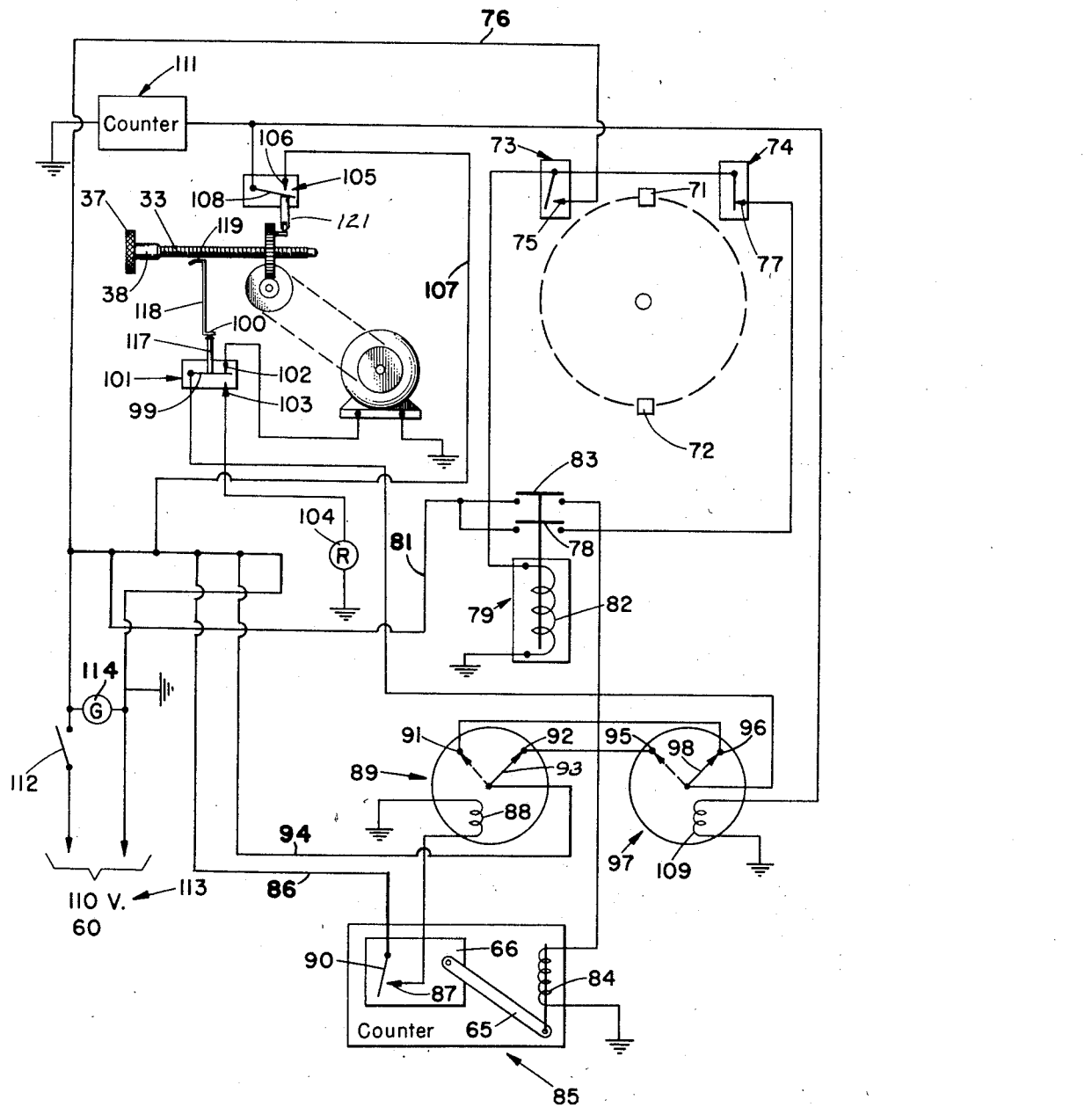
fig. 8
INVENTOR.
WALTER G. KLETTKE
BY
ATTORNEY

United States Patent Office 2,819,699
Patented Jan. 14, 1958

2,819,699

COMBINED AUTOMATIC FOOD DISPENSER AND EXERCISING CAGE

Walter G. Klettke, Kalamazoo, Mich., assignor to The Upjohn Company, Kalamazoo, Mich., a corporation of Michigan Application October 7, 1954, Serial No. 460,903

18 Claims. (Cl. 119—51)

This invention relates in general to apparatus for dispensing food to a test animal, as a rat, in proportion to the amount of energy expended by said animal and more particularly to a type thereof having a rotatable cage which said animal must move a predetermined amount in order to receive a measured increment of food.

Machines for dispensing food to an animal in response to movement of a part of the machine by the animal and for recording the amount of such movement are broadly not new. However, the machines presently used for this purpose, insofar as I am aware, fail to dispense the food in accurate proportion to the energy expended by the animal and are not satisfactory where close, accurate determinations are required. For example, one present machine of this general type has a cylindrical cage rotatable by the animal placed therein and is designed to record only complete revolutions of the cage. In this machine, the cage can be rocked or oscillated through a very large arc, but less than a complete circle, without registering any movement at all by the animal. Or, where in this same type of machine a single electrical switch is operated by a single means on the cage, the cage can be oscillated through a very small arc back and forth across said switch and thereby record a full revolution of the cage with each such small oscillation.

Further, in the prior machine with which I am acquainted, there is some energy absorbed by the mechanical operation of the switches as the cage rotates. This energy must come from the animal and it is difficult, if not impossible, to make an accurate allowance for it, so that it becomes energy expended by the animal but not recorded. Thus, it is desirable to reduce this energy requirement to a minimum.

Accordingly, a primary object of this invention is the provision of an automatic apparatus for dispensing food to an animal in measured increments corresponding to the amount of movement of, hence energy expended by, the animal.

A further object of this invention is the provision of an apparatus, as aforesaid, wherein the dispensing of the food is made accurately responsive to the amount and frequency of the movement of the animal.

A further object of this invention is to provide an apparatus as described above for use with a rotary cage or the like to automatically supply increments of food to a caged animal in direct proportion to animal work expended in imparting motion to the cage and embodying registering means operable only between fixed limits of cage motion so as to average out unregistered units of cage motion induced by animal work with registered units of cage motion not so induced.

A further object of the invention has been to provide a device, as aforesaid, wherein the energy required to operate the non-recording portions thereof is reduced to a minimum.

A further object of the invention is to provide a rotary cage with a communicating feed compartment associated with an automatic, electrically operated, mechanical dispensing means easily recharged with food and including circuit breaking and warning means operable when recharging is needed.

A further object of this invention is the provision of an apparatus, as aforesaid, having means for dispensing the food which can be rapidly reset and refilled after a complete charge of food has been dispensed, and having means which automatically indicates when a complete charge has been dispensed by said dispensing means and recharging is therefore necessary.

Other objects and purposes of this invention will appear to persons familiar with this type of equipment upon reading the following specification and examining the accompanying drawings in which:

Figure 1 is a front elevation view of a structure embodying my invention.

Figure 2 is an elevation view of the left side of the structure shown in Figure 1 with the end plate thereof removed.

Figure 3 is an enlarged, sectional view substantially as taken along the line III—III of Figure 2.

Figure 4 is a sectional view substantially as taken along the line IV—IV of Figure 3.

Figure 5 is a sectional view substantially as taken along the line V—V of Figure 3.

Figure 6 is an enlarged, sectional view as taken along the line VI—VI of Figure 1.

Figure 7 is a sectional view as taken along the line VII—VII of Figure 1.

Figure 8 is a partially diagrammatic and partially schematic view of my invention including the electrical system and circuits thereof.

Figure 9 is a schematic showing of a modification.

In meeting the objects and purposes set forth above as well as others relates thereto, I have provided a U-shaped frame structure including a rectangular perforated compartment open on one side and positioned between the spaced upstanding columns of the frame. A cylindrical cage having perforated walls is rotatably supported for rotation about a horizontal axis adjacent to the open side of said compartment and in communication therewith. A food dispensing tube is connected to and communicates with said compartment on the side thereof remote from said cage. Means including an axially slidable and reciprocable stem is provided for advancing material through said tube. An internally threaded gear is rotatably supported upon said frame and threadedly engages said stem, rotation of said gear by means including a motor effecting axial movement of said stem. Switches, operable by the flux of a plurality of spaced magnets mounted on said cage, are located adjacent the path of said magnets and connected to an appropriate electrical system to effect rotation of said motor.

Detailed construction

As best shown in Figures 1, 2 and 7, the automatic food dispenser 10 is comprised of a U-shaped frame structure 11 which may be fabricated from any convenient material such as sheet metal. The frame structure 11 has left and right, spaced, upwardly extending, hollow columns 12 and 13 at the opposite sides thereof. The rear wall 14 (Figures 2 and 6) of the frame structure 11 extends above said frame structure to provide a closure plate 20 for the open adjacent, axial end 15 of a cylindrical cage 16 adjacent to said rear wall. The cage 16 is supported for rotation about a horizontal axis upon the shaft 17 which is secured to the closure plate 20. A rectangular feeding compartment 18 is mounted upon the closure plate 20 and the frame 11 between the columns 12 and 13. Said compartment 18 is open at the rearward end 19 for continuous communication with the open end 15 of the cage 16 through an appropriate aperture 21 (Figure 7) in said plate 20 near the lower part of cage 16. Both said cage and said compartment are preferably made from a perforate material such as wire mesh, for reasons appearing hereinafter. A funnel shaped collector pan 22 is disposed beneath both the cage 16 and the compartment 18 for collecting the excretions of an animal placed in the cage 16. The pan 22 has a drain nipple 23 beneath which a flask 24 (Figure 2) may be placed for collecting said excretions.

Means defining a feeding location are provided and here include a semi-cylindrical feeding trough 25 (Figures 1, 6 and 7) which is provided with a mounting flange 26 by which said trough is removably mounted upon the wall 18a (Figure 7) defining the front side of the compartment 18. The trough 25 communicates with said compartment through an aperture in the wall 18a. The right hand end of trough 25, as appearing in Figure 6, is closed and the left hand end is open. Means defining a supply chamber are provided communicating with the trough 25. The supply chamber is defined by a food dispensing tube 27, which is cylindrical in this particular embodiment, and which is co-axial with the trough 25 and communicates therewith at said left end. The left end of said tube is threadably received in an aperture 28 (Figure 3) in the inner wall 29 of the left hand column 12 and extends substantially perpendicularly from said inner wall. The right end of the tube 27 is provided with a screen 31 held by an open center cap 30 through which the food in the tube 27 is urged by the piston or plunger 32. The piston is urged toward the screen 31 by a rod or stem 33 which is co-axial with tube 27 and engageable at its right hand end with the piston 32. The stem 33 is externally threaded substantially throughout its length and is provided with a knurled head 37 (Figure 3) at its leftward end. Adjacent said head, a portion of an enlarged diameter provides a shoulder 38 on said stem for reasons appearing hereinafter.

A gear box 35 (Figure 3) is secured, as by bolts 36, to that part of the inner wall 29 of column 12 adjacent the aperture 28. The stem 33 extends through an opening in the left wall 34 of the gear box 35 axially aligned with said aperture 28. An internally threaded worm gear 41 having a hub 42 is threadedly supported upon the stem 33 within the gear box 35. Said hub 42 is mounted within an anti-friction bearing 43 which is in turn mounted in a recess 44 in the inner surface of the relatively thick, left wall 34 of the gear box 35. A partition 45 (Figure 3), having a central opening for receiving the stem 33 in the gear box 35, is provided for preventing the piston 32 from sliding into the gear box and for preventing grease or other foreign matter in the gear box from contaminating the food in the tube 27.

A lock rod 47 (Figure 3) extends vertically downwardly through an appropriate opening in the left wall 34 of the gear box 35 and is provided with a key 48 at the lower end thereof for slidable reception into a longitudinal groove, or keyway, 39 in the stem 33. The key 48 positively prevents rotation of the stem 33, but permits axial slidable movement thereof through the left wall 34. Thus, rotation of the worm gear 41 will effect an axial movement of the stem 33 against the piston 32. A set screw 49 (Figure 5) may be provided for fixing the lock rod 47, hence the key 48, in position to prevent rotation of said stem 33.

Mechanism for driving the worm gear 41 (Figures 2, 3 and 4) includes an upper sprocket shaft 51 rotatably supported in a horizontal position by means of bearings 52 and 53 mounted in the side walls 54 and 55, respectively, of the gear box 35. A worm 57 is mounted upon the shaft 51 in continuous engagement with worm gear 41 for imparting rotary motion to the worm gear. The sprocket shaft 51 extends outwardly of the wall 55 where it carries an upper sprocket 58 connected by a chain 59 to a lower sprocket 63. A motor 61 is supported by a bracket 62 mounted upon the rear wall 14 within the frame structure 11 below the left hand column 12 for driving said lower sprocket 63 through a gear box 64. Thus, it will be seen that energizing the motor 61 imparts rotary motion to worm gear 41 and, due to key 48, linear motion, only, to stem 33 for moving piston 32 through tube 27 toward the trough 25.

*Electrical system*

As shown in Figures 7 and 8, switch operators, a pair of magnets 71 and 72, are mounted upon the rear side of the cage 16 in diametrically disposed relation to swing in the same circular path about the axis of rotation of the cage. The electric circuit, broadly a sequential type circuit, is an accumulative measuring system and includes a pair of switches 73 and 74 (Figure 8) actuable by a magnetic flux and supported by any suitable means in positions closely adjacent to the path of the magnets 71 and 72. The switches 73 and 74 may be of the type known as the "Mercoid Magnetic Type Switch," manufactured by the Mercoid Corporation, Chicago, Illinois, and illustrated in detail in Mercoid Corporation catalog No. 600, Figures 3–11–R and 3–13–R. Where two magnets 71 and 72 are used, as in this embodiment, the said switches are preferably positioned 90 degrees from each other along the path of said magnets.

The switch 73 is normally open and switch 74 is normally closed. Both switches are of the type which are momentarily actuated from their normal position into the opposite position by the flux of a passing magnet. The armatures of the switches 73 and 74 are connected to each other and the contact 75 of the switch 73 is connected to an electrically energized line 76. The contact 77 of the switch 74 is connectible through one pole 78 of a double pole, self-locking switch or first relay 79 to the electrically energized line 81. The interconnected armatures of the switches 73 and 74 are connected to the locking coil 82 of the switch 79 and then to ground. The other pole 83 of the switch 79 connects the line 81 to the coil 84 of the counter 85, said counter 85 being of a type such that a predetermined, usually selectable, number of separate energizations of the coil 84 will, through mechanical linkages 65 and 66 (Figure 8) of conventional type, effect a closure of the switch elements 87 and 90. The armature 90 of the counter 85 is connected to the electrically energized line 86 and the contact 87 of said counter 85 is connected to the coil 88 of a second relay 89 and then to ground. The relay 89 has a pair of contacts 91 and 92 and an armature 93 connected to an electrically energized line 94. The contacts 91 and 92 are connected to the contacts 96 and 95, respectively, of a third relay 97, whose armature 98 is connected to the armature 99 of the disconnect switch 101. The motor contact 102 of switch 101, which is normally engaged by the armature 99, is connected to ground through the motor 61.

The warning contact 103 of the switch 101 is connected to ground through a warning device, such as a red light 104. A normally open, control switch 105 has a contact 106 connected to an electrically energized line 107 and an armature 108 connected in series with the coil 109 of the relay 97 and then to ground. The armature 108 is also connected to ground through an alternate counter 111, said counter 111 and said coil 109 being in parallel.

The electrically energized lines 76, 81, 86, 94 and 107 described hereinabove may be supplied through one supply switch 112 from any suitable source 113, as 110 volt 60 cycle, electrical energy. However, any one or more of said lines may be independent of said source 113, although in the case of lines 76 and 81 they must, if they are independent of each other, be of identical characteristics with respect to each other. A green light 114 may be placed in series with the switch 112, but preferably in parallel with the rest of the circuit, to indicate when said switch is closed.

The disconnect switch 101 (Figures 3, 4 and 8) is supported beneath the gear box 35 by means of a bracket 116 so that its plunger 117 is adjacent the left hand side of the gear box, as shown in Figure 3. An elongated actuator 118 (Figures 3 and 8) is vertically and slidably disposed upon the left hand side of the gear box 35 between the stem 33 and the plunger 117. Such vertical slidability may be effected by providing said actuator 118 with slotted openings (Figure 5) through which screws extend into said gear box. The lower end of said actuator 118 is provided with a flange 100 engageable with the plunger 117 on said switch 101. The upper end of said actuator 118 is provided with another flange 119 engageable by the shoulder 38 of the stem 33 when said shoulder has reached the end limits of its rightward travel. Such engagement between the shoulder 38 and the flange 119 effects a movement of the armature 99 (Figure 8) of the switch 101 from the motor contact 102 to the warning contact 103, thereby energizing the red light 104 which indicates that the stem 33 has moved rightwardly (Figure 6) as far as it can and that the food within the tube 27 has been completely discharged.

The control switch 105 (Figures 3, 4 and 8) is mounted upon the inner wall 29 of the left column 12 and above the gear box 35. A plunger 121 on the switch 105 extends downwardly through an appropriate opening 122 in the top of the gear box for engagement by a pin 124 extending from the rightward face of the worm gear 41 within the gear box 35. When said pin strikes the plunger 121 the switch 105 closes thereby energizing both the relay coil 109 and the alternate counter 111.

Operation

In operation the trough 25 is removed from the compartment 18 and the tube 27 is filled with food. This may be done by removing the cap 30 and screen 31 from the rightward end of said tube and placing a charge of food into said tube. The same result may be accomplished by removing the entire tube from the aperture 28 in the inner wall 29 of the left column 12. If the stem 33 is within the tube 27 (Figure 6), such as after a complete operation cycle, it must be returned leftwardly to its Figure 3 position. This is done by releasing the set screw 49 and raising the lock rod 47 until the key 48 is disengaged from the groove 39. Then by rotating the head 37 of the stem 33 said stem is returned to the position (Figure 3) after which the key 48 may be again placed in the groove 39 and the lock rod 47 locked in position again for a new cycle of operation.

Energization of the motor 61 operating through the gear box 64, the sprockets 63, the chain 59, the sprocket 58, the worm 57 and the worm gear 41, effects the rightward axial movement of the stem 33 from its position of Figure 3 to its position in Figure 6. Such movement of the stem 33 is dependent upon the movement of the cage 16 operating through the electrical system including the counter 85 and the relays 89 and 97, as will now be described.

As shown in Figure 7, the cage 16 is in this embodiment provided with a pair of diametrically disposed magnets 71 and 72. Both switches 73 and 74 are operable by the flux of either one of said magnets and are located at 90 degrees from each other along the path of said magnets as said cage is rotated, that is, at an angular distance one-half of the corresponding angular spacing of the magnets. It was found that, with the switches approximately 90 degrees apart, movements of the freely rotating cage 16 which did not represent properly recordable movements by the animal were balanced out against those movements which did represent properly recordable activity by said animal that would otherwise escape recording. It will be recognized that, by increasing the number of magnets and/or switches associated with said magnets, the apparatus may be made increasingly sensitive to movements of the cage, providing only that the switches continue to be placed an angular distance equal to one-half the corresponding spacing of the magnets. In this particular embodiment, however, the arrangement hereinabove described and disclosed was found satisfactory within normal experimental requirements after careful and exhaustive observation of the movements of the animal within the cage.

Since the switch 74 is normally closed, the momentary opening thereof by the flux of either of the magnets will produce no effect upon the electrical system prior to a closing of switch 73. However, a momentary closure of the normally open switch 73 by one of said magnets closes the circuit from line 76 through switch 73 and through the locking coil 82 of the switch 79 to ground, thereby closing switch 79. The pole 78 connects the line 81 through the switch 74 to said coil 82 thereby locking said switch 79 in closed position. The closure of the switch 79 also energizes the coil 84 in the counter 85 from line 81 through the pole 83 of said switch 79. Further actuation of the switch 73 will have no effect upon the switch 79, until the normally closed switch 74 has been operated and momentarily opened by one of the magnets. When switch 74 is opened by one of said magnets, the coil 82 will be de-energized thereby opening the switch 79 and de-energizing the coil 84 in the counter 85. De-energization will effect one count of the counter 85 and will automatically reset that portion of the electrical system including the switches 73 and 74 and 79 for another cycle of actuation of the counter 85, as hereinabove described. Although the count occurs in counter 85 upon de-energization of coil 84 in this particular embodiment, such count could be effected upon energization with equal satisfaction. The number of such actuations of the counter which are required before the armature 90 of the counter 85 is closed depends upon the mechanical setting of the counter. When the counter contact 87 is closed, the coil 88 of the relay 89 will be energized from the line 86.

At the next actuation of the counter 85, due to sequential operation of the switches 73 and 74, the contact 87 of the counter 85 will be opened thereby de-energizing the coil 88 of the relay 89 whereby the armature 93 thereof will be moved from the solid line position shown in Figure 8 to the broken line position. Such movement will connect the line 94 through the relay 89 and the relay 97, through the switch 101 to the motor 61 thereby causing same to rotate. By the gears connected between the motor 61 and the worm gear 41, said worm gear is caused to rotate until the pin 124 engages the plunger 121 of the switch 105 thereby closing and then opening said switch. When the switch 105 is thus momentarily closed, the coil 109 of the relay is energized momentarily and at the same time the alternate counter 111 is actuated. Energization, followed by de-energization, of the coil 109 causes the armature 98 of the relay 97 to move from its solid line position to its broken line position, as shown in Figure 8. Since the armature 93 of the relay 89 is presently in its broken line position, movement of said armature 98 to said broken line position disconnects the motor 61 from the line 94. This completes one cycle of operation of the electrical system. The next energization and de-energization of the coils 88 by the counter 85 will move the armature 93 to its solid line position and thereby again close the circuit from line 94 through the armature 98, which is now in its broken line position. This will initiate the same action as before and energization, followed by deenergization, of the winding 109 in response to the switch 105 will effect a shift of the armature 98 back to its solid line position. This disconnects the energizing circuit of the motor 61 and the cycle is completed, with the parts returned to the position shown in Figure 8 of the drawing. It will be observed that each such cycle of operation causes the worm gear 41 to be rotated approximately one revolution thereby advancing the stem 33 the distance of its pitch, and thereby causing an increment of food to be urged through the screen 31 into the trough 25. After a series of such cycles of operation of the electrical system, the stem 33 is eventually moved rightwardly until it reaches the Figure 6 position whereupon the upper flange 119 of the actuator 118 (Figures 3 and 7) is moved downwardly by the shoulder 38 of the stem 33. This causes the plunger 117 of the switch 101 to be depressed, thereby moving the armature of said switch from the motor contact 102 to the warning contact 103 and illuminating the warning lamp 104. This indicates that the stem 33 has moved rightwardly as far as it can, that the tube 27 is empty of food and that the apparatus must be reloaded. Inasmuch as the switch 101 has been placed in the open position, the motor 61 is completely disconnected from the electrical system, thereby positively preventing any further rightward movement of the stem 33 and resultant injury to the apparatus. The apparatus may be recharged and the stem easily recocked, as described hereinabove, for a new period of cycle operation without materially disturbing the experiment. It takes a very short time, as one or two minutes, to release the lock rod 47, unscrew the stem 33 and recharge the tube 27. In fact, it will often be found advantageous to replace the tube 27 which has been discharged with another tube which is fully charged and ready for operation.

Thus, it will be seen that, with the switches 73 and 74 and magnets 71 and 72 arranged as described herein, a movement by said cage 16 of at least 90 degrees is required to effect an actuation of the counter 85. This will prevent actuating of the counting mechanism as a result of small, meaningless, oscillations of the cage across a single switch.

Figure 9 shows an arrangement for reducing this minimum angle to 45 degrees namely, by placing the switches 73 and 74 at 45 degrees from each other and adding magnets 71a and 72a positioned 90 degrees from magnets 71 and 72.

Although I have described a particular, preferred embodiment of my invention for illustrative purposes, it will be understood that modifications thereof within the scope of my invention are fully contemplated unless specifically stated to the contrary in the appended claims.

I claim:

1. In an apparatus for dispensing food to an animal in proportion to the amount of energy voluntarily expended by said animal, the combination comprising: a cage and frame means supporting same for rotation about a horizontal axis; means defining a feeding location communicating with and continously accessible from said cage; a supply chamber operatively connected to and communicating with said feeding location; drive means for urging the contents of said supply chamber to said feeding location; and automatic means connected to said cage and to said drive means for actuating said drive means in response to and in proportion to predetermined movement of said cage.

2. An apparatus for dispensing food to an animal in proportion to the amount of energy voluntarily expended by said animal, comprising in combination: a cylindrical cage and frame means supporting same for rotation about a horizontal axis; means defining a feeding location adjacent to and continuously accessible from said cage; a supply chamber connected to and communicating with said feeding location; drive means for urging the contents of said supply chamber to said feeding location; a plurality of spaced switch operators secured to said cage; a plurality of spaced switches on said frame means located adjacent to the path of said switch operators, said switches being operated by any of said switch operators when adjacent thereto; electrical means including a sequential circuit actuated by said switches connected to said drive means for operating said drive means, said drive means being operated a predetermined increment in response to a predetermined sequence of operations of said switches.

3. In an apparatus for dispensing food to an animal in proportion to the amount of energy voluntarily expended by said animal, the combination comprising: a cylindrical cage and frame means supporting same for rotation about a horizontal axis; a compartment adjacent to, and continuously in communication with, said cage; a supply chamber communicating at one end with said compartment; drive means for urging the contents of said supply chamber into said compartment; an automatic means connected to said drive means and responsive to movement of said cage for actuating said drive means in response and in proportion to a predetermined movement of said cage.

4. An apparatus for dispensing food to an animal in proportion to the amount of energy voluntarily expended by said animal, comprising in combination: a cylindrical cage and frame means supporting same for rotation about a horizontal axis; a compartment adjacent to, and continuously in communication with, said cage; a supply chamber communicating at one end with said compartment and drive means for urging the contents of said supply chamber into said compartment; a plurality of spaced magnets secured to said cage; a plurality of spaced switches on said frame means located adjacent to the path of said magnets, said switches being operated by any of said magnets when adjacent thereto; electrical means including an accumulative measuring system actuated by said switches, said drive means being operated in a predetermined amount in response to a predetermined sequence and number of operations of said switches.

5. An apparatus for dispensing food to an animal in response to predetermined movements by said animal, the combination comprising: a support structure including a compartment; a cylindrical cage supported for rotation with respect to said structure about a horizontal axis, said cage being in continuous communication with said compartment; a food tube communicating at one end with said compartment and drive means for urging food from said tube into said compartment; a pair of spaced switch operators secured to said cage for movement therewith through substantially the same path; a pair of spaced switches located adjacent to said path, each switch being operated by said switch operators when substantially adjacent thereto; an electrical system including a source of electrical energy and a sequential circuit actuated by said switches, said drive means being operated in a predetermined amount by said circuit in response to a predetermined number of sequential actuations by said switches.

6. The structure of claim 5 wherein said cage and said compartment have perforated walls and removable means are provided below said cage and said compartment for collecting the excretions of said animal.

7. The structure of claim 5 wherein said compartment is adjacent one axial end of said cage, said end and the opposing side of said compartment being open; and wherein said tube communicates with said compartment through said side.

8. The structure of claim 5 wherein said drive means comprises: a piston slidably disposed in said tube and a threaded stem aligned with said tube and with said piston for moving said piston and slidably supported by said structure; a gear threadedly supported upon said stem and held against axial movement for axially advancing said stem when said gear is rotated; a motor and means connecting same to said gear, said motor being energized by said system to effect rotation of said gear.

9. The structure of claim 5 wherein said drive means comprises: a piston slidably disposed in said tube; a threaded stem supported upon said structure, co-axial with said tube, for movement along said axis and for engagement with said piston, said stem having a lengthwise groove therein; a gear threadedly supported upon said stem for advancing same into said tube when said gear is rotated, said gear being held against axial movement; a motor and means connecting same to said gear, said motor being energized by said system to rotate said gear with respect to said stem; and a key removably held by said structure and slidably disposed within said groove for preventing rotation of said stem with respect to said structure.

10. The structure of claim 5 wherein said drive means includes a motor and said sequential circuit comprises a counter in series with said switches and said source, said counter being actuated when, and only when, both of said switches have been operated, a normally open relay in series with said motor and said source, said relay being operated by said counter, after a predetermined number of actuations thereof, to energize said motor, a normally closed relay in series with said open relay and operated by said drive means after a predetermined total movement thereof to de-energize said motor.

11. The structure of claim 5 wherein said magnets are diametrically disposed on said cage, equidistant from the rotational axis thereof, and said switches are spaced 90 degrees from each other along the said path.

12. In an apparatus having drive means including a motor for advancing food from a tube into a compartment in continuous communication with a cylindrical cage rotatably supported about its axis, said cage having a pair of spaced magnets supported thereon for movement in the same path, the circuit for energizing said drive means in response to certain movements of said cage comprising: a source of electrical energy; a pair of spaced, armature connected, switches located adjacent to said path, each switch being operable by a magnet when substantially adjacent thereto, the contact of one of said switches being directly connected to said source and the contact of the other of said switches being connectible to said source by, and only by, the operation of said one of said switches; a first relay having its winding in series with said one of said switches and said source; a counter actuated when, and only when, said relay is operated; a second relay in series with said motor and said source, said second relay being operated by said counter, after a predetermined number of actuations thereof, to energize said motor; a third relay in series with said second relay and said motor, said third relay being operated by said drive means after a predetermined amount of operation thereof to de-energize said motor.

13. In an apparatus having drive means including a motor and a switch actuator rotated thereby for advancing food from a tube into a compartment in continuous communication with a cylindrical cage rotatably supported about its axis, said cage having a pair of spaced magnets supported thereon for movement in the same path, the circuit for energizing said drive means in response to certain movement of said cage, comprising: a source of electrical energy; a pair of spaced, armature connected, switches located adjacent to said path, each switch being operable by a said magnet when substantially adjacent thereto, the contact of one of said switches being directly connected to said source and the contact of the other of said switches being connectible to said source by, and only by, the operation of said one switch; a first relay having a winding in series with said one switch and said source; a counter actuated when, and only when, said relay is operated; a second relay in series with said motor and said source, said second relay being operated by said counter, after a predetermined number of actuations thereof, to energize said motor; a third relay in series with said second relay and said motor; a normally open, control switch in series with said source and said third relay, said control switch being closable by said actuator to operate said third relay and thereby de-energize said motor.

14. In an apparatus having drive means including a motor for advancing food from a tube into a compartment in continuous communication with a cylindrical cage rotatably supported about its axis, said cage having a pair of spaced magnets supported thereon for movement in the same path, the circuit for energizing said drive means in response to certain movement of said cage comprising: a source of electrical energy; a pair of spaced, armature connected, switches located adjacent to said path, one switch being normally open and the other normally closed, and each switch being operable by a said magnet when substantially adjacent thereto; a self locking switch having a locking coil in series with said source and said one switch, and having its contacts in series with said source, said other switch and said locking coil, said locking switch being closed by closure of said one switch and opened by opening of said other switch; a counter connectible to said source through said locking switch contacts, said counter being actuated when, and only when, said locking switch and said one switch are operated; a first relay in series with said motor and said source, said first relay being operated by said counter, after a predetermined number of actuations thereof, to energize said motor; a second relay in series with said first relay and said motor, said second relay being operated by said drive means after a predetermined amount of operation thereof to de-energize said motor.

15. In an apparatus having drive means including a switch actuator rotated thereby for advancing food from a tube into a compartment in continuous communication with a cylindrical cage rotatably supported about its axis, said cage having a pair of spaced magnets supported thereon for movement in the same path, the circuit for energizing said drive means in response to certain movement of said cage comprising: a source of electrical energy; a pair of spaced, armature connected switches located adjacent to said path, one switch being normally open and the other normally closed, and each switch being operable by a said magnet when substantially adjacent thereto; a self locking switch having a locking coil in series with said source and said one switch, and having its contacts in series with said source, said other switch and said locking coil, said locking switch being closed by closure of said one switch and opened by opening of said other switch; a counter connectible to said source through said locking switch contacts, said counter being actuated when, and only when, said locking switch and said one switch are operated; a first relay in series with said motor and said source, said first relay being operated by said counter, after a predetermined number of actuations thereof, to energize said motor; a second relay in series with said first relay and said motor; a normally open, control switch in series with said source and said second relay, said control switch being closable by said actuator to operate said second relay and thereby de-energize said motor; a disconnect switch between said motor and said second relay, said disconnect switch being held open by said drive means, when said food is discharged from said tube, whereby said motor is isolated from said source.

16. In an apparatus having drive means including a motor for advancing food from a tube into a compartment in continuous communication with a cylindrical cage rotatably supported about its axis, said cage having a pair of spaced magnets supported thereon for movement in the same path, the circuit for energizing said drive means in response to certain movement of said cage comprising: a source of electrical energy; a first relay having a locking coil; a pair of spaced switches operable by either of said magnets, operation of one switch connecting said source directly to said coil momentarily and indirectly to said coil through said relay and the other switch, and operation of said other switch disconnecting said source from said coil; a counter in series with said source through said first relay and actuated when, and only when, said relay is operated; a second relay in series with said motor and said source, said second relay being operated by said counter, after a predetermined number of actuations thereof, to energize said motor; a third relay in series with said second relay and said motor, said third relay being operated by said drive means after a predetermined amount of operation thereof to de-energize said motor.

17. In an apparatus having drive means including a motor for advancing food from a tube into a compartment in continuous communication with a cylindrical cage rotatably supported about its axis, said cage having a pair of spaced magnets supported thereon for movement in the same path, the circuit for energizing said drive means in response to certain movement of said cage comprising: a source of electrical energy; a first relay having a locking coil; a pair of spaced switches, one normally open and the other normally closed, located adjacent to said path, each switch being operable by either of said magnets, said one switch being in series with said source and said coil for closing, when operated, said first relay, and said other switch being in series with said source, said relay and said coil for holding said first relay closed and, when operated, for opening said first relay; a counter in series with said source through said first relay and actuated when, and only when, said relay is operated; a second relay in series with said motor and said source, said second relay being operated by said counter, after a predetermined number of actuations thereof, to energize said motor; a third relay in series with said second relay and said motor, said third relay being operated by said drive means after a predetermined amount of operation thereof to de-energize said motor.

18. The device of claim 2 wherein the switches are spaced from each other one-half the angular distance, based on the center of rotation of the cage, that exists between the switch operators.

References Cited in the file of this patent
UNITED STATES PATENTS

| | | |
|---|---|---|
| 2,640,460 | Siegel | June 2, 1953 |
| 2,661,122 | Peterson | Dec. 1, 1953 |